United States Patent
Shi et al.

(10) Patent No.: US 10,715,421 B2
(45) Date of Patent: Jul. 14, 2020

(54) ROUTING RULE OBTAINING METHOD, DEVICE, AND SYSTEM

(71) Applicant: HUAWEI TECHNOLOGIES CO., LTD., Shenzhen, Guangdong (CN)

(72) Inventors: Xiaoyan Shi, Shenzhen (CN); Chunshan Xiong, Beijing (CN); Qianghua Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/883,732

(22) Filed: Jan. 30, 2018

(65) Prior Publication Data

US 2018/0159765 A1   Jun. 7, 2018

Related U.S. Application Data

(63) Continuation of application No. PCT/CN2015/085805, filed on Jul. 31, 2015.

(51) Int. Cl.
*H04L 12/707* (2013.01)
*H04L 12/741* (2013.01)
(Continued)

(52) U.S. Cl.
CPC ............ *H04L 45/24* (2013.01); *H04L 45/74* (2013.01); *H04W 40/02* (2013.01); *H04L 45/64* (2013.01)

(58) Field of Classification Search
CPC ......... H04L 45/24; H04L 45/74; H04L 45/64; H04W 40/02
See application file for complete search history.

(56) References Cited

U.S. PATENT DOCUMENTS

2015/0124622 A1   5/2015   Kovvali et al.
2016/0050125 A1*  2/2016   Mattson ............ H04L 41/5051
                                                              709/225
(Continued)

FOREIGN PATENT DOCUMENTS

CN   101309302   11/2008
CN   103338206   10/2013
(Continued)

OTHER PUBLICATIONS

International Search Report dated May 9, 2016 in corresponding International Patent Application No. PCT/CN2015/085805.
(Continued)

*Primary Examiner* — Jae Y Lee
(74) *Attorney, Agent, or Firm* — Leydig, Voit & Mayer, Ltd.

(57) ABSTRACT

A routing rule obtaining method, device, and system are provided. The method is applied to an MEC system and performed by a data bus controller, including: obtaining service information of at least one service in the MEC system, where service information of each service includes a service type and a service identity; generating a routing rule according to the service information of the at least one service, where the routing rule is used to indicate at least one path through which a data packet can pass; and sending the routing rule to a data bus, so that the data bus forwards, according to the routing rule, a received data packet to a service corresponding to the data packet. The service information of each service is dynamically obtained, so as to update a path indicated in a routing rule.

13 Claims, 10 Drawing Sheets

(51) Int. Cl.
*H04W 40/02* (2009.01)
*H04L 12/715* (2013.01)

(56) References Cited

U.S. PATENT DOCUMENTS

| | | | |
|---|---|---|---|
| 2016/0212050 A1 | 7/2016 | Yin et al. | |
| 2018/0212962 A1* | 7/2018 | Reznik | H04W 12/06 |
| 2018/0295098 A1* | 10/2018 | Yuzawa | H04L 12/66 |

FOREIGN PATENT DOCUMENTS

| | | |
|---|---|---|
| CN | 103841022 A | 6/2014 |
| CN | 104518967 A | 4/2015 |
| GB | 2414626 | 11/2005 |
| JP | 2005012468 A | 1/2005 |
| JP | 2018518927 A | 7/2018 |
| WO | 2016206742 A1 | 12/2016 |

OTHER PUBLICATIONS

"Mobile-Edge Computing (MEC); Technical Requirements," Draft ETSI GS MEC 002, V0.4.2, Jun. 2015, XP014250218, 42 pgs.
Extended European Search Report dated Jun. 12, 2018, in corresponding European Patent Application No. 15899978.9, 8 pgs.
Japanese Notice of Allowance dated Feb. 5, 2019 in corresponding Japanese Patent Application No. 2018-500770 (2 pages).
Chinese Office Action dated Mar. 19, 2019 in corresponding Chinese Patent Application No. 201580042653.9 (5 pages).
International Search Report, dated May 9, 2016, in International Application No. PCT/CN2015/085805 (4 pp.).
Written Opinion of the International Searching Authority, dated May 9, 2016, in International Application No. PCT/CN2015/085805 (7 pp.).

* cited by examiner

ROUTING RULE OBTAINING METHOD, DEVICE, AND SYSTEM

CROSS-REFERENCE TO RELATED APPLICATIONS

This application is a continuation of International Application No. PCT/CN2015/085805, filed on Jul. 31, 2015, which is hereby incorporated by reference in their entireties.

TECHNICAL FIELD

Embodiments of the present application relate to communications technologies, and in particular, to a routing rule obtaining method, device, and system.

BACKGROUND

Mobile Edge Computing (MEC for short) means that an Internet service environment and a cloud computing capability are provided on a radio access network close to a mobile subscriber, and creates a highly distributed environment for deploying an application and a service. In addition, MEC can implement data storage and processing, and can also implement exposure of real-time radio network information, and provide personalized and context-related service experience for the mobile subscriber.

FIG. 1 is a schematic architecture diagram of an MEC system. As shown in FIG. 1, the MEC system includes an MEC infrastructure, an MEC application platform, and multiple virtual MEC applications (APP for short). The MEC infrastructure includes an MEC hardware resource and an MEC virtualization layer, and is used to provide hardware support and a service for the MEC application platform. The MEC application platform includes a manager and multiple virtual application services, for example, traffic offload function (TOF for short), a radio network information exposure service, and a communications service and service registry. These services may be invoked by an MEC app to implement a corresponding function. In the MEC system, a data packet needs to be transmitted between different services or applications according to a preconfigured forwarding path, so that data can be transmitted to a correct service or application according to a user requirement and be processed correctly.

However, a virtual application or service may change continually. How to dynamically determine a path for data transmission is a problem that is still not resolved. As a result, during data routing in MEC, a data routing error is caused when forwarding is performed according to a configured path.

SUMMARY

Embodiments of the present application provide a routing rule obtaining method, device, and system, so as to resolve the following problem: Because a virtual application or service may change continually, during data routing in MEC, a data transmission path cannot be dynamically determined, and a data routing error is caused when forwarding is performed according to a configured path.

A first aspect of the present application provides a routing rule obtaining method, applied to a Mobile Edge Computing MEC system, where the MEC system includes a data bus controller and a data bus, and the method includes:

obtaining, by the data bus controller, service information of at least one service in the MEC system, where service information of each service includes a service type and a service identity;

generating, by the data bus controller, a routing rule according to the service information of the at least one service, where the routing rule is used to indicate at least one path through which a data packet can pass, and each path includes a service identity of at least one service; and sending, by the data bus controller, the routing rule to the data bus, so that the data bus forwards, according to the routing rule, a received data packet to a service corresponding to the data packet.

With reference to the first aspect, in a first possible implementation of the first aspect, the generating, by the data bus controller, a routing rule according to the service information of the at least one service includes:

obtaining, by the data bus controller, the routing rule according to a preset routing rule generation protocol and the service type and the service identity of the at least one service, where the routing rule includes at least one filter and path information corresponding to each filter, and each filter is configured to indicate a source address, a destination address, a sending protocol, a source port number, and a destination port number of a corresponding path.

With reference to the first possible implementation of the first aspect, in a second possible implementation of the first aspect, each filter is further configured to indicate a base station address and/or a gateway address of the corresponding path.

With reference to the first aspect, or the first or the second possible implementation of the first aspect, in a third possible implementation of the first aspect, the obtaining, by the data bus controller, service information of at least one service in the MEC system includes:

receiving, by the data bus controller, the service information of the at least one service in the MEC system sent by a service registry apparatus; or receiving, by the data bus controller, the service information reported by each service in the MEC system; or receiving, by the data bus controller, the service information of the at least one service in the MEC system sent by a service manager.

With reference to any one of the first aspect, or the first to the third possible implementations of the first aspect, in a fourth possible implementation of the first aspect, the routing rule further specifically includes a path identifier list and path information about at least one path, the path identifier list includes a correspondence between each filter and a path identifier, and the path information includes a path identifier and a service identity of at least one service corresponding to the path identifier.

With reference to the fourth possible implementation of the first aspect, in a fifth possible implementation of the first aspect, the data bus includes a classifier and a service forwarder, and the sending, by the data bus controller, the routing rule to the data bus, so that the data bus forwards, according to the routing rule, the data packet to each service in the service list includes:

sending, by the data bus controller, the at least one filter and the path identifier list to the classifier, so that the classifier determines a first path identifier of the received data packet according to the at least one filter and the path identifier list, adds the first path identifier to the data packet, and sends, to the service forwarder, the data packet to which the first path identifier is added; and sending, by the data bus controller, the path identifier list and the path information about the at least one path to the service forwarder, so that the service forwarder forwards, to the corresponding service according to the path identifier list, the path information about the at least one path, and the first path identifier, the received data packet sent by the filter.

A second aspect of the present application provides a data bus controller, including:

an obtaining module, configured to obtain service information of at least one service in a Mobile Edge Computing MEC system, where service information of each service includes a service type and a service identity;

a processing module, configured to generate a routing rule according to the service information of the at least one service, where the routing rule is used to indicate at least one path through which a data packet can pass, and each path includes a service identity of at least one service; and a sending module, configured to send the routing rule to a data bus, so that the data bus forwards, according to the routing rule, a received data packet to a service corresponding to the data packet.

With reference to the second aspect, in a first possible implementation of the second aspect, the processing module is specifically configured to:

obtain the routing rule according to a preset routing rule generation protocol and the service type and the service identity of the at least one service, where the routing rule includes at least one filter and path information corresponding to each filter, and each filter is configured to indicate a source address, a destination address, a sending protocol, a source port number, and a destination port number of a corresponding path.

With reference to the second aspect or the first possible implementation of the second aspect, in a second possible implementation of the second aspect, the obtaining module includes:

a first receiving unit, configured to receive the service information of the at least one service in the MEC system sent by a service registry apparatus; or a second receiving unit, configured to receive the service information reported by each service in the MEC system; or a third receiving unit, configured to receive the service information of the at least one service in the MEC system sent by a service manager.

With reference to any one of the second aspect, or the first or the second possible implementation of the second aspect, in a third possible implementation of the second aspect, the routing rule generated by the processing module further specifically includes a path identifier list and path information about at least one path, the path identifier list includes a correspondence between each filter and a path identifier, and the path information includes a path identifier and a service identity of at least one service corresponding to the path identifier.

With reference to the third possible implementation of the second aspect, in a fourth possible implementation of the second aspect, the data bus includes a classifier and a service forwarder, and the sending module includes:

a first sending unit, configured to send the at least one filter and the path identifier list to the classifier, so that the classifier determines a first path identifier of the received data packet according to the at least one filter and the path identifier list, adds the first path identifier to the data packet, and sends, to the service forwarder, the data packet to which the first path identifier is added; and a second sending unit, configured to send the path identifier list and the path information about the at least one path to the service forwarder, so that the service forwarder forwards, to the corresponding service according to the path identifier list, the path information about the at least one path, and the first path identifier, the received data packet sent by the filter.

A third aspect of the present application provides a data bus controller, including:

a receiver, configured to obtain service information of at least one service in a Mobile Edge Computing MEC system, where service information of each service includes a service type and a service identity;

a processor, configured to generate a routing rule according to the service information of the at least one service, where the routing rule is used to indicate at least one path through which a data packet can pass, and each path includes a service identity of at least one service; and a transmitter, configured to send the routing rule to a data bus, so that the data bus forwards, according to the routing rule, a received data packet to a service corresponding to the data packet.

A fourth aspect of the present application provides a routing rule obtaining system, including a data bus controller and a data bus, where the data bus controller obtains service information of at least one service in a Mobile Edge Computing MEC system, where service information of each service includes a service type and a service identity;

the data bus controller generates a routing rule according to the service information of the at least one service, where the routing rule is used to indicate at least one path through which a data packet can pass, and each path includes a service identity of at least one service;

the data bus controller sends the routing rule to the data bus; and the data bus receives the routing rule sent by the data bus controller, and forwards, according to the routing rule, a received data packet to a service corresponding to the data packet.

With reference to the fourth aspect, in a first possible implementation of the fourth aspect, the data bus controller is specifically configured to:

obtain the routing rule according to a preset routing rule generation protocol and the service type and the service identity of the at least one service, where the routing rule includes at least one filter and path information corresponding to each filter, and each filter is configured to indicate a source address, a destination address, a sending protocol, a source port number, and a destination port number of a corresponding path.

With reference to the fourth aspect or the first possible implementation of the fourth aspect, in a second possible implementation of the fourth aspect, the system further includes at least one service and a service registry apparatus;

each service in the MEC system sends service information of the service to the service registry apparatus;

the service registry apparatus receives the service information sent by the at least one service;

the service registry apparatus sends the service information of the at least one service to the data bus controller; and the data bus controller receives the service information of the at least one service sent by the service registry apparatus.

With reference to the fourth aspect or the first possible implementation of the fourth aspect, in a third possible implementation of the fourth aspect, the system further includes at least one service;

each service in the MEC system sends service information of the service to the data bus controller; and the data bus controller receives the service information reported by each service.

With reference to the fourth aspect or the first possible implementation of the fourth aspect, in a fourth possible implementation of the fourth aspect, the system further includes a service manager;

the service manager obtains the service information of the at least one service in the MEC system, and sends the service information of the at least one service to the data bus controller; and the data bus controller receives the service information of the at least one service sent by the service manager.

With reference to any one of the fourth aspect, or the first to the fourth possible implementations of the fourth aspect, in a fifth possible implementation of the fourth aspect, the routing rule generated by the data bus controller further specifically includes a path identifier list and path information, the path identifier list includes a correspondence between each filter and a path identifier, and the path information includes a path identifier and a service identity of at least one service corresponding to the path identifier.

With reference to the fifth possible implementation of the fourth aspect, in a sixth possible implementation of the fourth aspect, the data bus includes a classifier and a service function forwarder, where the sending, by the data bus controller, the routing rule to the data bus includes:

sending, by the data bus controller, the at least one filter and the path identifier list to the classifier; and sending, by the data bus controller, the path identifier list and the path information about the at least one path to the service function forwarder; and the receiving, by the data bus, the routing rule sent by the data bus controller, and forwarding, according to the routing rule, a received data packet to a service corresponding to the data packet includes:

receiving, by the classifier, the at least one filter and the path identifier list sent by the data bus controller;

determining, by the classifier, a first path identifier of the received data packet according to the at least one filter and the path identifier list, adding the first path identifier to the data packet, and sending, to the service function forwarder, the data packet to which the first path identifier is added;

receiving, by the service function forwarder, the data packet to which the first path identifier is added and that is sent by the classifier; and forwarding, by the service function forwarder to the corresponding service according to the path identifier list, the path information about the at least one path, and the first path identifier, the received data packet sent by the filter.

The routing rule obtaining method, device, and system provided in the present application are applied to the MEC system. The data bus controller obtains the service information of the at least one service in the MEC system, and generates the routing rule according to the service information of the at least one service, where the routing rule indicates the at least one path through which a data packet can pass, and each path includes the service identity of at least one service. The data bus controller sends the routing rule to the data bus, so that the data bus updates an original routing rule to the new routing rule and forwards the received data packet to the service corresponding to the data packet. The service information of all services is dynamically obtained, so as to update a path indicated in the routing rule, that is, add a service path. This ensures that received data can be forwarded according to the new routing rule and the data is correctly routed to the corresponding service. Therefore, data routing correctness is ensured.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

The present application provides a data routing method in an MEC system. A main implementation process is as follows: A data bus (English: Traffic Bus, TB for short) controller in MEC obtains service information (also referred to as status information) of a service or an application from the service or application (Service/App), service registry (SR for short), an operations support system (OSS for short), or a business support system (BSS for short); then, the data bus controller establishes a routing rule according to obtained service information of all applications or services, where the routing rule includes a service chain path generated by the data bus controller; finally, the data bus controller sends the routing rule to a TB, to update a routing rule in the TB or separately update rules in a classifier (that is, a device implementing a classification function) and a service forwarder (English: Service Function Forwarder, SFF for short), so that the data bus can forward a received data packet according to the new routing rule. MEC is also referred to as a mobile edge platform or a mobile edge system.

Figure 1:
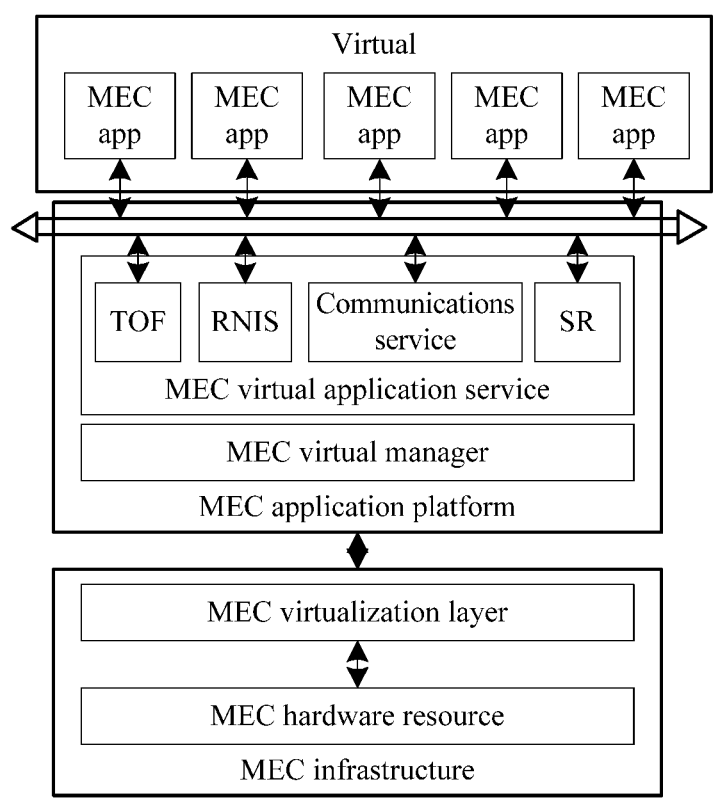
FIG. 1 is a schematic architecture diagram of an MEC system.
Figure 2:
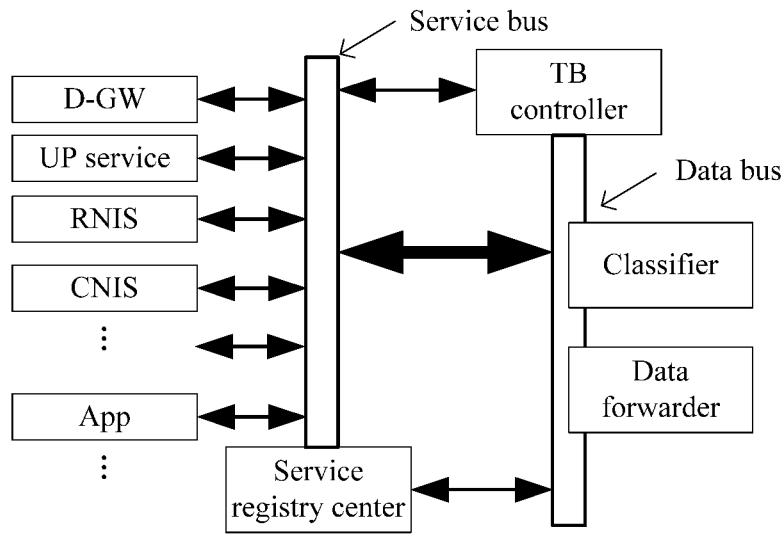
FIG. 2 is a schematic diagram of an MEC architecture according to the present application.

The technical solutions of the present application are applied to an MEC architecture. FIG. 2 is a schematic diagram of an MEC architecture according to the present application. As shown in FIG. 2, the architecture includes a TB controller, a data bus (including a service forwarder and a classifier), a service bus, a service registry center (also referred to as a service registry apparatus), and at least one improvable service or application, for example, various services or APPs such as a gateway (GW for short), a user plane (UP for short) service, a core network information exposure service (English: Core Network Information Service, CNIS for short), and a radio network information exposure service (English: Radio Network Information Service, RNIS for short). The TB controller can directly interact with the registry center and the application or service by using the data bus and the service bus. In the MEC architecture, the classifier is configured to receive a data packet and select a data routing path. The service forwarder is configured to forward the data packet to a correct service or application according to the routing path determined by the classifier. The TB controller is configured to deliver, to the classifier and/or the service forwarder, a routing rule including various types of path information.

Figure 3:
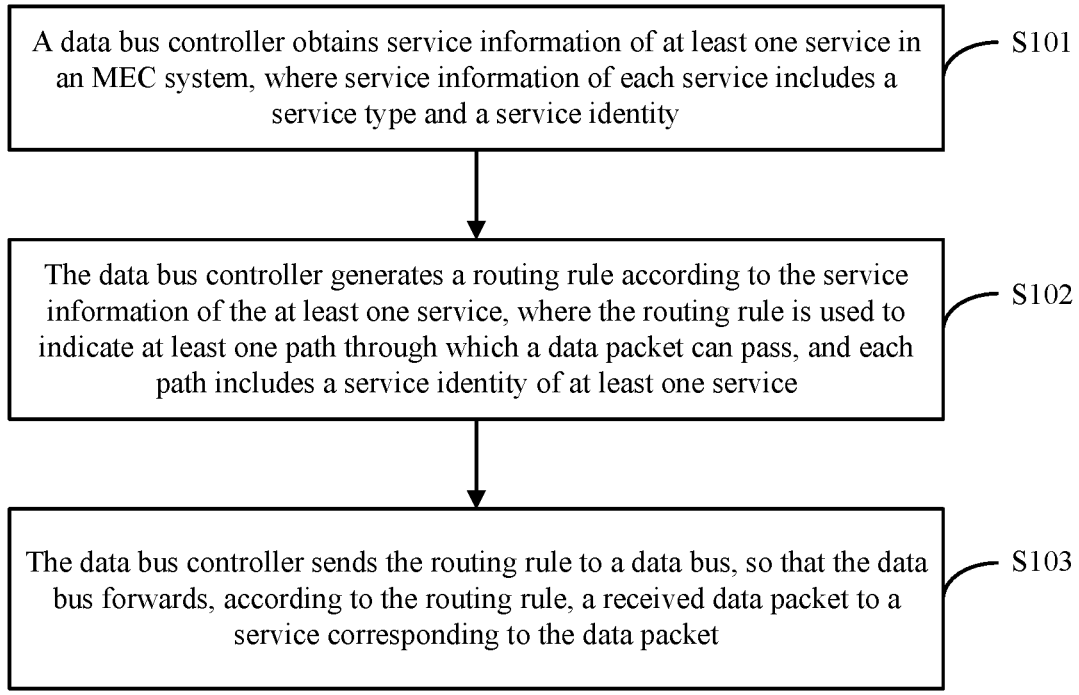
FIG. 3 is a flowchart of a first embodiment of a routing rule obtaining method according to the present application.

FIG. 3 is a flowchart of a first embodiment of a routing rule obtaining method according to the present application. As shown in FIG. 3, the method is applied to an MEC system. Based on the MEC architecture shown in FIG. 2, the solution is executed by a data bus controller. Specific steps of the routing rule obtaining method include the following.

S101: The data bus controller obtains service information of at least one service in the MEC system, where service information of each service includes a service type and a service identity.

In this embodiment, the service includes a service or an application (Service/App). When an application or a service is instantiated in the MEC system, the data bus controller needs to obtain information about the application or service. For example, whenever a service is newly added to MEC (or a service is deleted from MEC), service information of the service needs to be obtained anew. Service information of each service includes a service identity (ID for short) and a service type. There are at least the following several specific manners in which the data bus controller obtains the service information.

In a first manner, the data bus controller receives the service information of the at least one service in the MEC system sent by a service registry apparatus.

After installation of the service or application is completed, an instance of the service or application is registered on the service registry apparatus (also referred to as a service registry center). A carried parameter includes an identity and a type of the service or application. The service registry apparatus proactively sends the service information of the newly registered service or application to the data bus controller.

In a second manner, the data bus controller receives the service information reported by each service in the MEC system.

During installation of the service or application, the service or application obtains an address of the data bus controller. After installation is completed, the service or application sends an update message to the data bus controller. The update message includes a service identity or a service type of the application or service.

In a third manner, the data bus controller receives the service information of the at least one service in the MEC system sent by a service manager.

After installation of the service or application is completed, the service manager that manages MEC sends the information about the newly installed service or application to the data bus controller, and requests to update an available service or application in the data bus controller. Service information includes a service identity and a service type.

The foregoing provides three manners in which the data bus controller obtains the service information of the service or application in MEC. However, an obtaining manner is not limited to only the foregoing several manners. Any manner is acceptable provided that service information of all available services in the current MEC system is obtained in the manner. No limitation is imposed on specific implementation.

S102: The data bus controller generates a routing rule according to the service information of the at least one service, where the routing rule is used to indicate at least one path through which a data packet can pass, and each path includes a service identity of at least one service.

In this embodiment, the data bus controller obtains the routing rule according to a preset routing rule generation protocol and the service type and the service identity of the at least one service. A specific rule for obtaining a corresponding filter according to a service identity and/or a service type is stipulated in a specific protocol. The routing rule is used to indicate the at least one path through which a data packet can pass, and each path includes the service identity of at least one service. "Can pass through" herein means that the path through which a data packet can pass includes all paths that are possibly implemented and is not limited to one path. The data packet herein is also a general data packet, and is not limited to a specific data packet. The routing rule includes all paths through which received data possibly passes.

In specific implementation, the obtained routing rule includes at least one filter and path information corresponding to each filter, where each filter is configured to indicate a source address, a destination address, a sending protocol, a source port number, and a destination port number of a corresponding path. The path indicated by the path information includes a service identity of at least one service.

Optionally, each filter may be at least further configured to indicate a base station address and/or a gateway address of the corresponding path.

S103: The data bus controller sends the routing rule to a data bus, so that the data bus forwards, according to the routing rule, a received data packet to a service corresponding to the data packet.

In this embodiment, after obtaining the new routing rule, the data bus controller sends the routing rule to the data bus. The data bus updates an original routing rule to the new routing rule including all applications or services in the MEC system. If a data packet is sent to the data bus, the data bus classifies and forwards the data packet according to the new routing rule, to send the data packet to a destination service or application.

The routing rule obtaining method provided in this embodiment is applied to the MEC system. The data bus controller obtains the service information of the service in the MEC system, and generates the routing rule according to the service information of the at least one service, where the routing rule indicates the at least one path through which a data packet can pass, and each path includes the service identity of at least one service. The data bus controller sends the routing rule to the data bus. The service information is dynamically obtained, so as to update a path indicated in a routing rule, that is, add a path including a service identity of a changed service. This ensures that received data can be forwarded according to the new routing rule, and avoids a problem that a changed application cannot receive the data. The data is correctly routed to the corresponding service or application. Therefore, data routing correctness is ensured.

Figure 4:
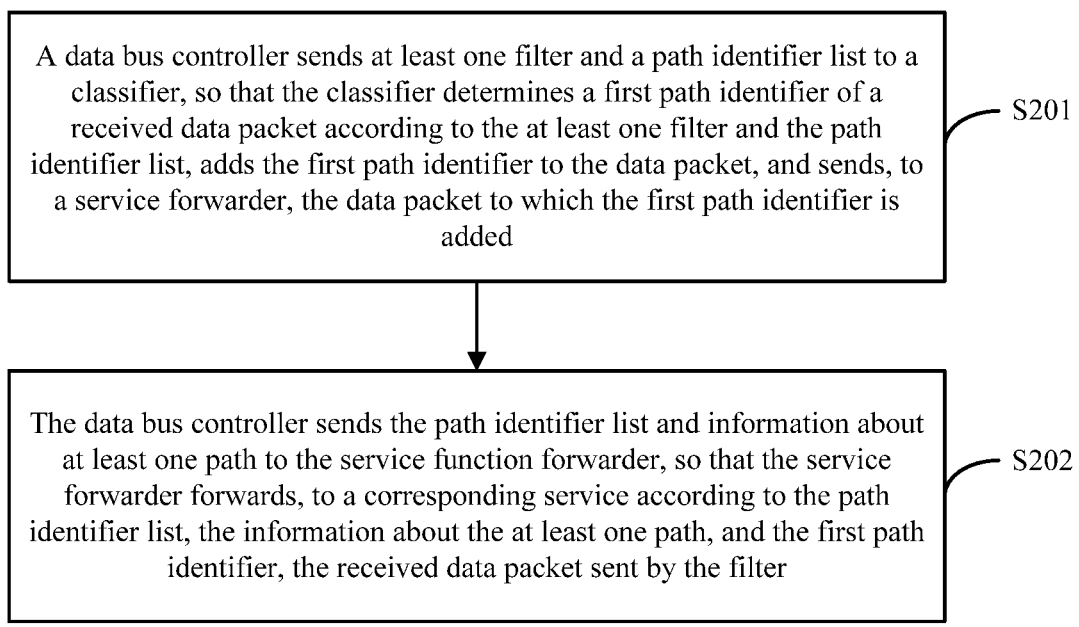
FIG. 4 is a flowchart of a second embodiment of a routing rule obtaining method according to the present application.

FIG. 4 is a flowchart of a second embodiment of a routing rule obtaining method according to the present application. As shown in FIG. 4, the method is applied to an MEC system. Based on the MEC architecture shown in FIG. 2, it can be learned that the data bus includes a classifier and a service forwarder. Based on the foregoing first embodiment, the routing rule further specifically includes a path identifier list and path information about at least one path. The path identifier list includes a correspondence between each filter and a path identifier. The path information includes a path identifier and a service identity of at least one service corresponding to the path identifier. In this case, in the foregoing step S103, specific implementation of the sending, by the data bus controller, the routing rule to a data bus, so that the data bus forwards, according to the routing rule, the data packet to each service in the service list includes the following two steps.

S201: The data bus controller sends the at least one filter and the path identifier list to the classifier, so that the classifier determines a first path identifier of the received data packet according to the at least one filter and the path identifier list, adds the first path identifier to the data packet, and sends, to the service forwarder, the data packet to which the first path identifier is added.

In this embodiment, the routing rule specifically includes several parts, including the at least one filter and further including the path identifier list and the path information about the at least one path. The path identifier list includes a correspondence between each filter and a path identifier, and the path information includes a path identifier and a service identity of at least one service corresponding to the path identifier. When the routing rule is sent to the data bus, sending is separately performed. A filter and at least one service of a path finally correspond to each other by using a path identifier.

Specifically, the data bus controller sends the at least one filter and the path identifier list to the classifier in the data bus. When receiving a data packet, the classifier determines, according to specific information about the data packet, a first path identifier corresponding to the data packet, and adds the first path identifier to the data packet. Generally, a field is added, to represent the first path identifier. In addition, the classifier sends, to the service forwarder, the data packet to which the first path identifier is added.

S202: The data bus controller sends the path identifier list and the path information about the at least one path to the service forwarder, so that the service forwarder forwards, to the corresponding service according to the path identifier list, the path information about the at least one path, and the first path identifier, the received data packet sent by the filter.

In this embodiment, the data bus controller sends the path identifier list and the path information about the at least one path to the service forwarder. After receiving the data packet to which the first path identifier is added and that is sent by the classifier, the service forwarder obtains path information of the data packet according to the first path identifier, the path identifier list, and the path information about the at least one path, and then forwards the data packet to the service, that is, a service or an application, on a corresponding path.

According to the routing rule obtaining method provided in this embodiment, the data bus controller obtains the service information of all services in the MEC system, generates, according to the service information of the at least one service, the routing rule including the filter, the path information, and the path identifier list, and separately sends the routing rule to the classifier and the service forwarder. The filter and the path information are associated by using the path identifier list. When the data bus receives the data packet, the classifier determines the path identifier according to the filter, and then sends the path identifier to the service forwarder. The service forwarder obtains the corresponding path information according to the path identifier of the data packet, and forwards the data packet to the corresponding application or service. According to the service information of all the services or applications that is obtained in real time, the new routing rule is flexibly established, and all service paths are quickly deployed. In this way, a data flow direction is correctly controlled after the data packet is received, and data is correctly routed to the corresponding service or application.

The foregoing two embodiments are both executed by the data bus controller. The following specifically describes a specific implementation process of the technical solutions of the present application by using an overall system as an execution body.

The routing rule obtaining system includes at least a data bus controller and a data bus. The data bus controller obtains service information of at least one service in a Mobile Edge Computing MEC system, where service information of each service includes a service type and a service identity. The data bus controller generates a routing rule according to the service information of the at least one service, where the routing rule is used to indicate at least one path through which a data packet can pass, and each path includes a service identity of at least one service. The data bus controller sends the routing rule to the data bus. The data bus receives the routing rule sent by the data bus controller, and forwards, according to the routing rule, a received data packet to a service corresponding to the data packet. The following specifically describes, by using several interaction embodiments, a process in which the system implements a routing rule obtaining method.

Figure 5:
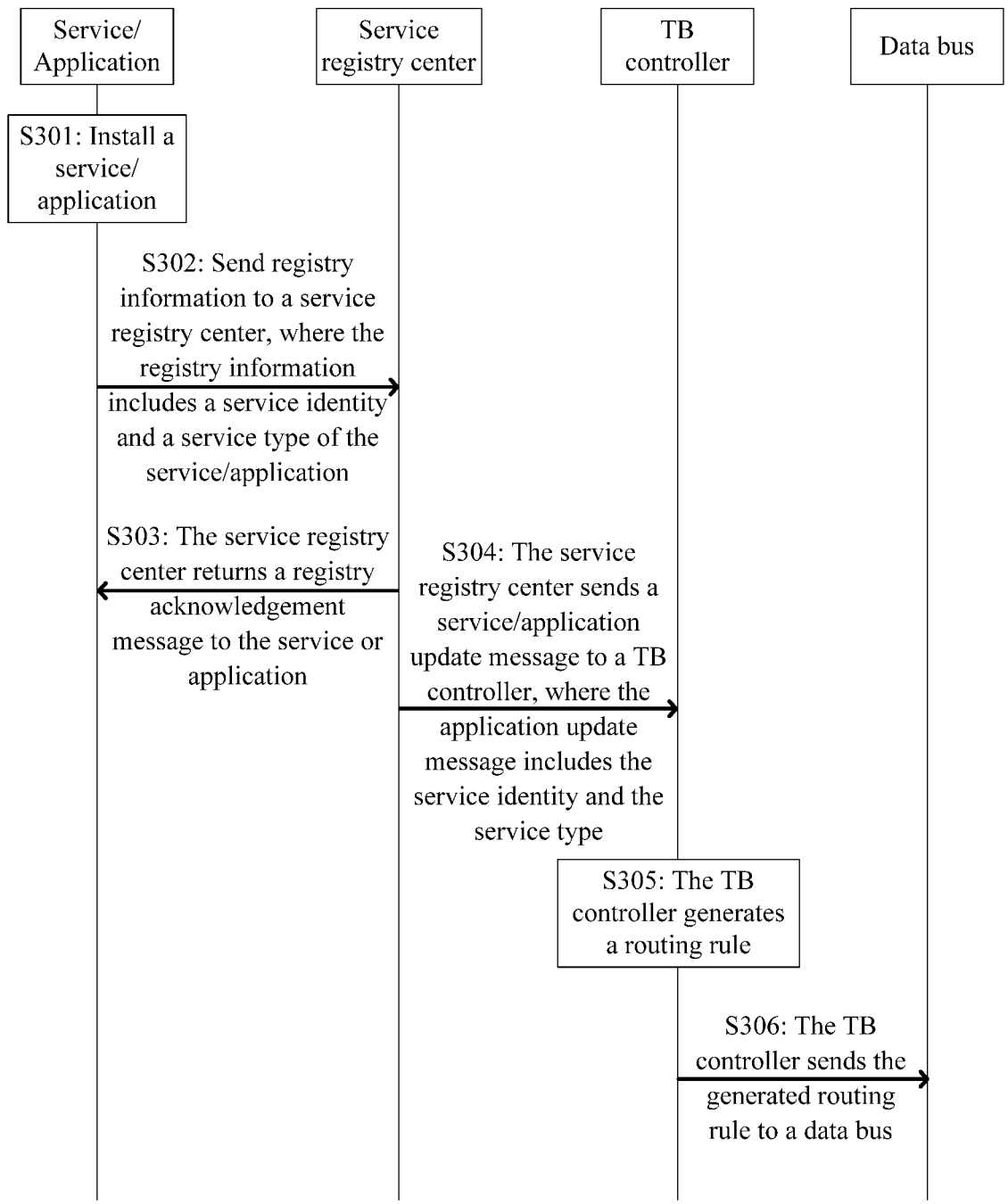
FIG. 5 is an interaction diagram of a first embodiment of a routing rule obtaining system according to the present application.

FIG. 5 is an interaction diagram of a first embodiment of a routing rule obtaining system according to the present application. As shown in FIG. 5, the system includes at least one service or application, a service registry center, a TB controller, and a data bus. For a manner of interaction between all the parts, refer to FIG. 2. Specific implementation steps of the solution are as follows.

S301: Install the service/application.

S302: Send registry information to the service registry center, where the registry information includes a service identity and a service type of the service/application.

S303: The service registry center returns a registry acknowledgement message to the service or application.

Specifically, after installation of the service/app is completed, an instance of the service/app is registered at the service registry center, where a carried parameter includes the service ID and the service type. After registry succeeds, the service registry center returns the acknowledgement message to the service/app, to acknowledge that the application or service is successfully registered.

S304: The service registry center sends a service/application update message to the TB controller, where the application update message includes the service identity and the service type.

A specific process is as follows: Each service in the MEC system sends service information of the service to the service registry apparatus; the service registry apparatus receives the service information sent by the at least one service; the service registry apparatus sends the service information of the at least one service to the data bus controller; the data bus controller receives the service information of the at least one service sent by the service registry apparatus. That is, the service registry center requests the TB controller to update an available service/app, and the parameter includes the service ID and the service type.

S305: The TB controller generates a routing rule.

Specifically, the routing rule is obtained according to a preset routing rule generation protocol and the service type and the service identity of the at least one service. The routing rule includes at least one filter and path information corresponding to each filter, and each filter is configured to indicate a source address, a destination address, a sending protocol, a source port number, and a destination port number of a corresponding path.

S306: The TB controller sends the generated routing rule to the data bus.

The data bus classifies and forwards a received data packet according to the new routing rule, to send the data packet to a destination application or service.

Figure 6:
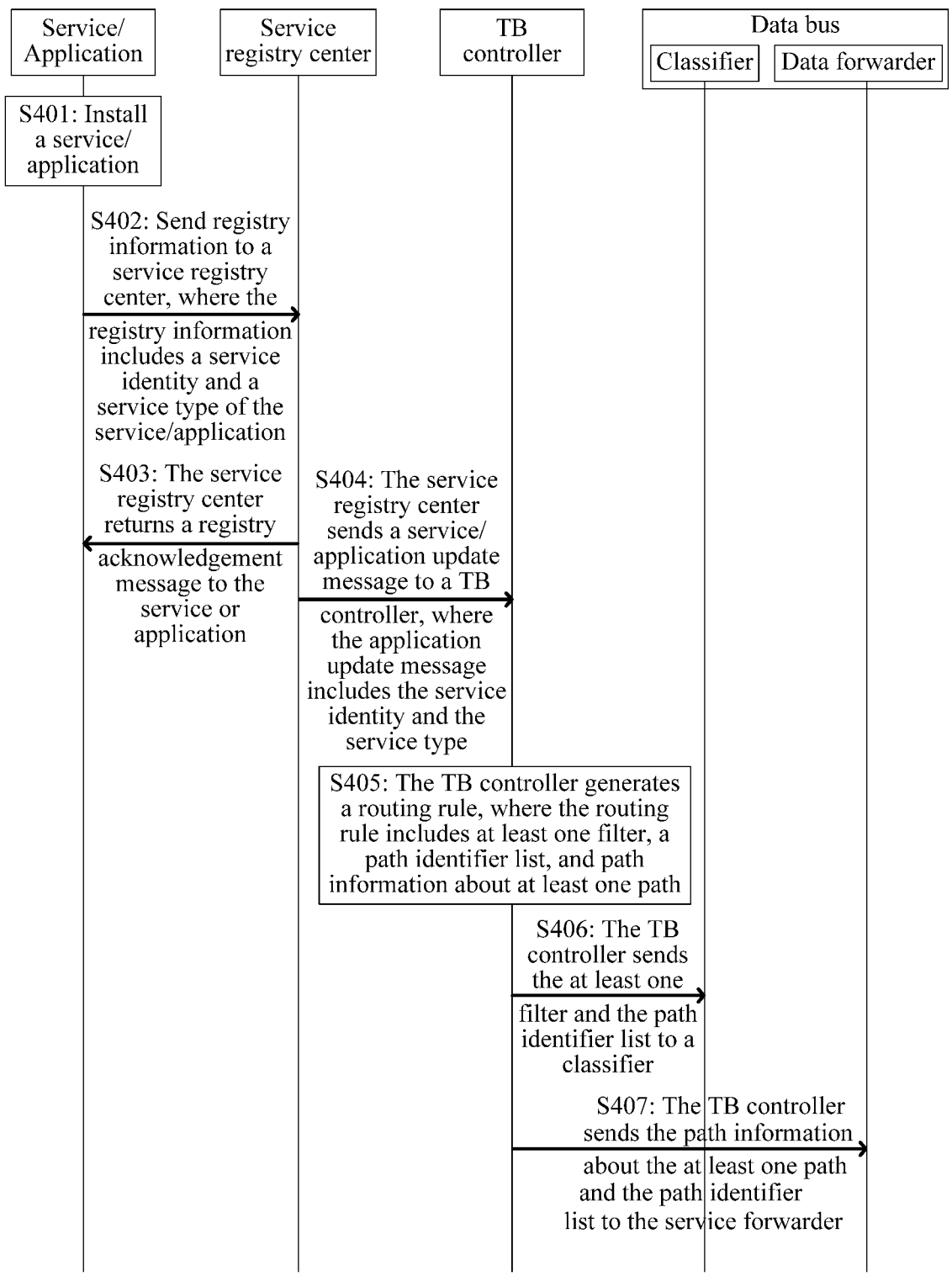
FIG. 6 is an interaction diagram of a second embodiment of a routing rule obtaining system according to the present application.

FIG. 6 is an interaction diagram of a second embodiment of a routing rule obtaining system according to the present application. As shown in FIG. 6, the system includes at least one service or application, a service registry center, a TB controller, and a data bus. The data bus includes a classifier and a service forwarder. For a manner of interaction between all the parts, refer to FIG. 2. Specific implementation steps of the solution are as follows.

S401: Install the service/application.

S402: Send registry information to the service registry center, where the registry information includes a service identity and a service type of the service/application.

S403: The service registry center returns a registry acknowledgement message to the service or application.

Specific descriptions are similar to those of the solution shown in FIG. 5. Details are not described herein again.

S404: The service registry center sends a service/application update message to the TB controller, where the application update message includes the service identity and the service type.

Specifically, the update message may include content of Table 1:

TABLE 1

App service information

| App ID | App type |
|---|---|
| App IP | Webpage |
| App IP | File |
| App IP | General |

S405: The TB controller generates a routing rule, where the routing rule includes at least one filter, a path identifier list, and path information about at least one path.

Specifically, the routing rule is obtained according to a preset routing rule generation protocol and the service type and the service identity of the at least one service. The routing rule includes the at least one filter and path information corresponding to each filter, and each filter is configured to indicate a source address, a destination address, a sending protocol, a source port number, and a destination port number of a corresponding path. The routing rule further specifically includes the path identifier list and the path information about the at least one path. The path identifier list includes a correspondence between each filter and a path identifier, and the path information includes a path identifier and a service identity of at least one service corresponding to the path identifier.

Based on the foregoing instance, Table 2 shows several filter instances in the routing rule. A source address, a destination address, a sending protocol, a source port number, and a destination port number of a path need to be indicated explicitly. In addition, a base station address and a gateway address may be determined according to an actual status.

TABLE 2

Several filter instances in the routing rule

| Source address | Destination address | Source port number | Protocol | Destination port number | Path identifier |
|---|---|---|---|---|---|
| UP IP | App IP | 222 | HTTP | 80 | Path_A/Index |
| UP IP | App IP | 333 | TCP | 21, 20 | Path_B/Index |

S406: The TB controller sends the at least one filter and the path identifier list to the classifier.

According to the foregoing example, the path information includes a path identifier and a service identity of at least one service corresponding to the path identifier, for example, a next-hop application address or service address corresponding to a service chain in Table 3, so that the data bus can forward a data packet according to the routing rule, and deliver the data packet to a corresponding application or service.

TABLE 3

Representation manner instance of path information

| Path identifier | Index | Next hop |
|---|---|---|
| Path_A | 1 | Application 2 (app IP) |
| Path_A | 0 | Service 1 (address) |
| Path_B | 1 | New application (IP) |
| Path_B | 0 | Service 3 (address) |

S407: The TB controller sends the path information about the at least one path and the path identifier list to the service forwarder.

In a specific implementation process, the data bus controller sends the at least one filter and the path identifier list to the classifier; the data bus controller sends the path identifier list and the path information about the at least one path to the service forwarder; the classifier receives the at least one filter and the path identifier list sent by the data bus controller; the classifier determines a first path identifier of a received data packet according to the at least one filter and the path identifier list, adds the first path identifier to the data packet, and sends, to the service forwarder, the data packet to which the first path identifier is added; the service forwarder receives the data packet to which the first path identifier is added and that is sent by the classifier; the service forwarder forwards, to a corresponding service according to the path identifier list, the path information about the at least one path, and the first path identifier, the received data packet sent by the filter.

Figure 7:
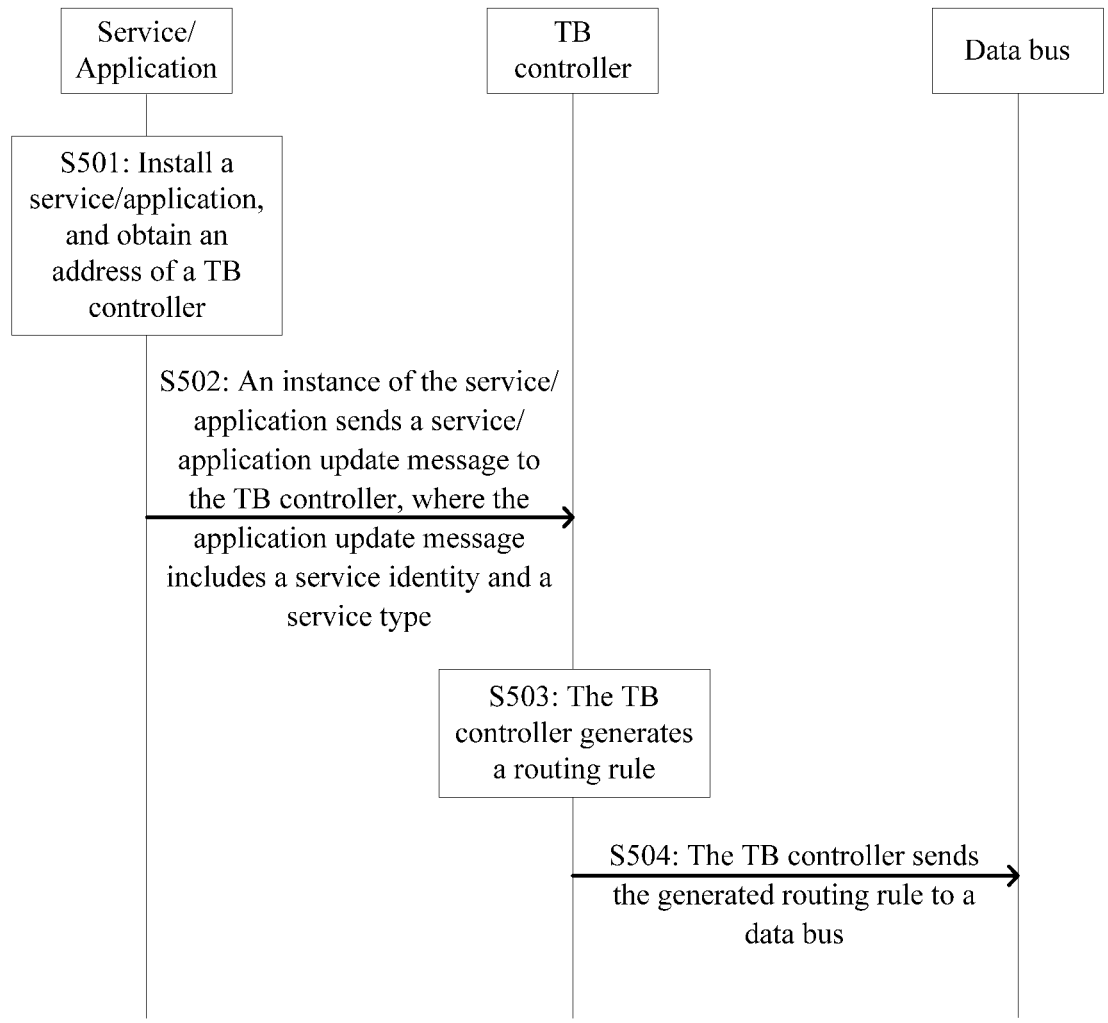
FIG. 7 is an interaction diagram of a third embodiment of a routing rule obtaining system according to the present application.

FIG. 7 is an interaction diagram of a third embodiment of a routing rule obtaining system according to the present application. As shown in FIG. 7, the system includes at least one service or application, a TB controller, and a data bus. For a manner of interaction between all the parts, refer to FIG. 2. Specific implementation steps of the solution are as follows.

S501: Install the service/application, and obtain an address of the TB controller.

S502: An instance of the service/application sends a service/application update message to the TB controller, where the application update message includes a service identity and a service type.

Specifically, each service in the MEC system sends service information of the service to the data bus controller, and the data bus controller receives the service information reported by each service.

S503: The TB controller generates a routing rule.

Specifically, the routing rule is obtained according to a preset routing rule generation protocol and the service type and the service identity of the at least one service. The routing rule includes at least one filter and path information corresponding to each filter, and each filter is configured to indicate a source address, a destination address, a sending protocol, a source port number, and a destination port number of a corresponding path.

S504: The TB controller sends the generated routing rule to the data bus.

In specific implementation of this solution, the routing rule further specifically includes a path identifier list and path information about at least one path. The path identifier list includes a correspondence between each filter and a path identifier, and the path information includes a path identifier and a service identity of at least one service corresponding to the path identifier.

Alternatively, the routing rule may be separately sent to a classifier and a service forwarder, to implement data packet classification and forwarding. An implementation thereof is similar to that in the solution shown in FIG. 6.

Figure 8:
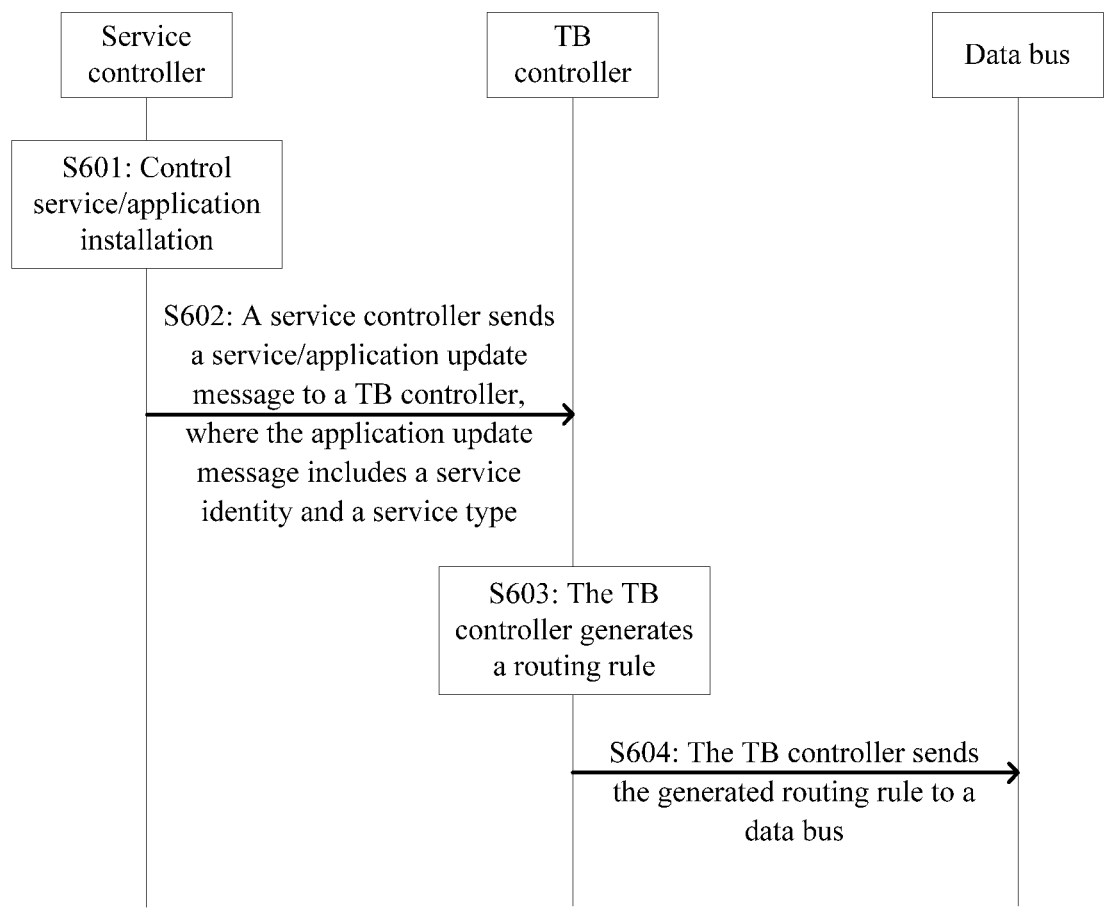
FIG. 8 is an interaction diagram of a fourth embodiment of a routing rule obtaining system according to the present application.

FIG. 8 is an interaction diagram of a fourth embodiment of a routing rule obtaining system according to the present application. As shown in FIG. 8, the system includes a service controller, a TB controller, and a data bus. Specific implementation steps of the solution are as follows.

S601: Control service/application installation.

S602: The service controller sends a service/application update message to the TB controller, where the application update message includes a service identity and a service type.

Specifically, after service/app installation is completed, the service controller (also referred to as a management unit) requests the TB controller to update an available service/app, and a parameter includes the service ID and the service type. Specific steps are as follows: The service manager obtains service information of at least one service in the MEC system, and sends the service information of the at least one service to the data bus controller; the data bus controller receives the service information of the at least one service sent by the service manager.

S603: The TB controller generates a routing rule.

S604: The TB controller sends the generated routing rule to the data bus.

Specific implementation of this solution is similar to the foregoing embodiment, and details are not described herein again.

Alternatively, the routing rule may be separately sent to a classifier and a service forwarder, to implement data packet classification and forwarding. An implementation thereof is similar to that in the solution shown in FIG. 6.

Figure 9:
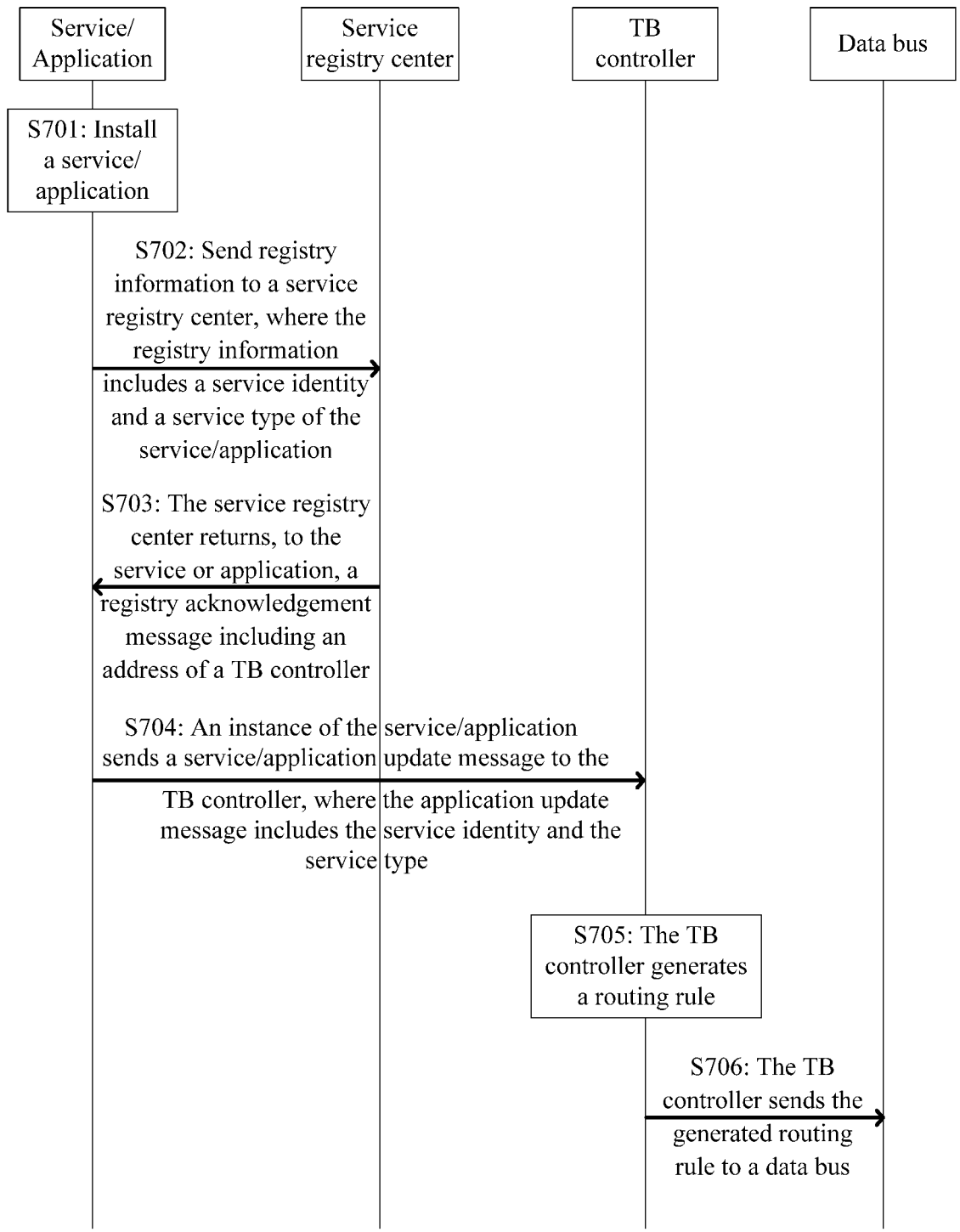
FIG. 9 is an interaction diagram of a fifth embodiment of a routing rule obtaining system according to the present application.

FIG. 9 is an interaction diagram of a fifth embodiment of a routing rule obtaining system according to the present application. As shown in FIG. 9, the system includes at least one service or application, a service registry center, a TB controller, and a data bus. For a manner of interaction between all the parts, refer to FIG. 2. Specific implementation steps of the solution are as follows.

S701: Install the service/application.

S702: Send registry information to the service registry center, where the registry information includes a service identity and a service type of the service/application.

S703: The service registry center returns, to the service or application, a registry acknowledgement message including an address of the TB controller.

Specifically, after installation of the service/app is completed, an instance of the service/app is registered at the service registry center, where a carried parameter includes the service ID and the service type. After registry succeeds, the service registry center returns, to the service/app, the registry acknowledgement message including the address of the TB controller, to acknowledge that the application or service is successfully registered.

S704: An instance of the service/application sends a service/application update message to the TB controller, where the application update message includes the service identity and the service type.

A specific process is as follows: Each service in the MEC system sends service information of the service to the service registry apparatus; the service registry apparatus receives the service information sent by the at least one service; the service registry apparatus sends the service information of the at least one service to the data bus controller; the data bus controller receives the service information of the at least one service sent by the service registry apparatus. That is, the service registry center requests the TB controller to update an available service/app, where the TB controller is corresponding to the returned address of the TB controller, and the parameter includes the service ID and the service type.

S705: The TB controller generates a routing rule.

Specifically, the routing rule is obtained according to a preset routing rule generation protocol and the service type and the service identity of the at least one service. The routing rule includes at least one filter and path information corresponding to each filter, and each filter is configured to indicate a source address, a destination address, a sending protocol, a source port number, and a destination port number of a corresponding path.

Optionally, before this step, the TB controller may further obtain, from a service manager, a priority of the service or application in the MEC system, so as to perform processing with reference to the priority during a routing rule generation process.

S706: The TB controller sends the generated routing rule to the data bus.

The data bus classifies and forwards a received data packet according to the new routing rule, to send the data packet to a destination application or service. In a specific implementation process, alternatively, the routing rule may be separately sent to a classifier and a service forwarder of the data bus, as shown in FIG. 6. Details are not described herein again.

In any one of the foregoing embodiments, the mentioned service controller may be an OSS/BSS in specific implementation, and the TB controller may directly access the OSS/BSS to obtain related information of the service/application.

Figure 10:
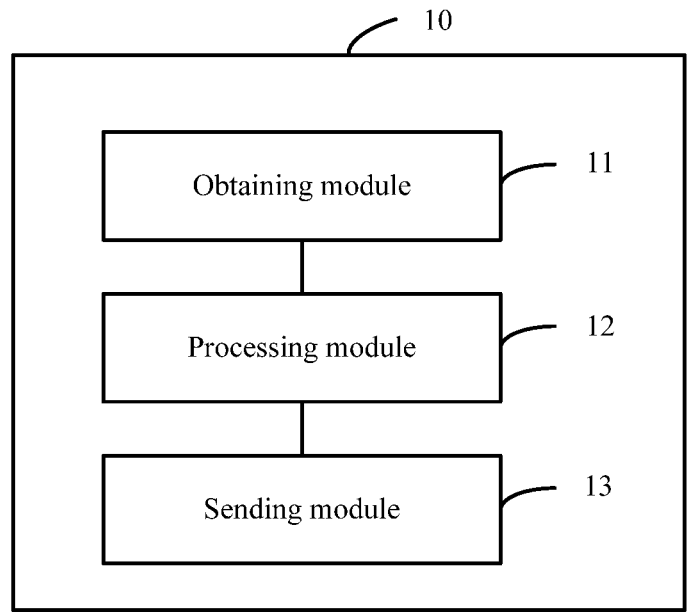
FIG. 10 is a schematic structural diagram of a first embodiment of a data bus controller according to the present application.

FIG. 10 is a schematic structural diagram of a first embodiment of a data bus controller according to the present application. As shown in FIG. 10, the data bus controller 10 includes an obtaining module 11, a processing module 12, and a sending module 13.

The obtaining module 11 is configured to obtain service information of at least one service in a Mobile Edge Computing MEC system, where service information of each service includes a service type and a service identity.

The processing module 12 is configured to generate a routing rule according to the service information of the at least one service, where the routing rule is used to indicate at least one path through which a data packet can pass, and each path includes a service identity of at least one service.

The sending module 13 is configured to send the routing rule to a data bus, so that the data bus forwards, according to the routing rule, a received data packet to a service corresponding to the data packet.

Optionally, the processing module 12 is specifically configured to:

obtain the routing rule according to a preset routing rule generation protocol and the service type and the service identity of the at least one service, where the routing rule includes at least one filter and path information corresponding to each filter, and each filter is configured to indicate a source address, a destination address, a sending protocol, a source port number, and a destination port number of a corresponding path.

Optionally, the routing rule generated by the processing module 12 further specifically includes a path identifier list and path information about at least one path. The path identifier list includes a correspondence between each filter and a path identifier, and the path information includes a path identifier and a service identity of at least one service corresponding to the path identifier.

The data bus controller provided in this embodiment is configured to execute the technical solution of the data bus controller in the technical solution shown in any one of FIG. 3 to FIG. 9. The service information of all services in the MEC system is dynamically obtained, so as to update a path indicated in a routing rule, that is, add a service path. This ensures that received data can be forwarded according to the new routing rule, and avoids a problem, such as a problem that some applications cannot receive the data or the data is not successfully sent. The received data is correctly routed to the corresponding application or service.

Figure 11:
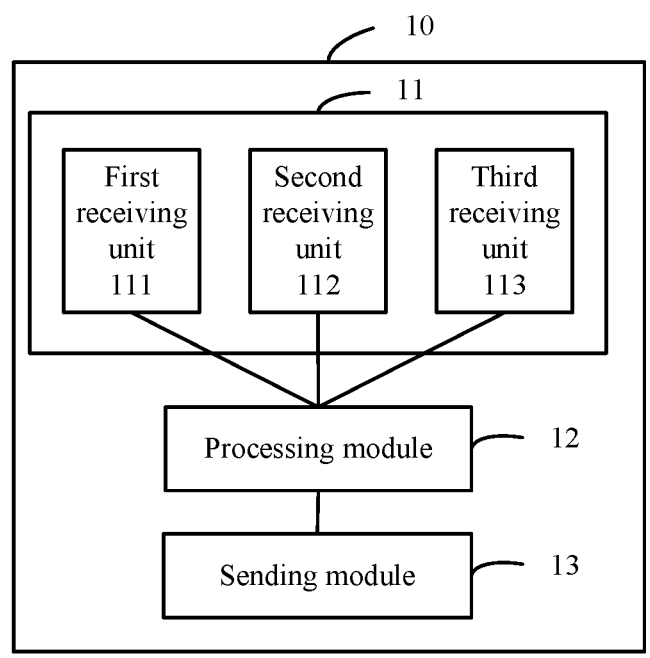
FIG. 11 is a schematic structural diagram of a second embodiment of a data bus controller according to the present application.

FIG. 11 is a schematic structural diagram of a second embodiment of a data bus controller according to the present application. As shown in FIG. 11, based on FIG. 10, the obtaining module 11 of the foregoing data bus controller 10 specifically includes:

a first receiving unit 111, configured to receive the service information of the at least one service in the MEC system sent by a service registry apparatus; or a second receiving unit 112, configured to receive the service information reported by each service in the MEC system; or a third receiving unit 113, configured to receive the service information of the at least one service in the MEC system sent by a service manager.

The data bus controller provided in this embodiment is configured to execute the technical solution of the data bus controller in the technical solution shown in any one of FIG. 3 to FIG. 9. An implementation principle and technical effects of the data bus controller are similar to those of the technical solution of the data bus controller shown in any one of FIG. 3 to FIG. 9. Details are not described herein again.

Figure 12:
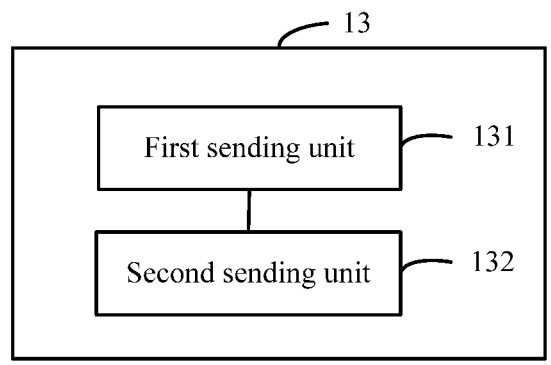
FIG. 12 is a schematic structural diagram of a third embodiment of a data bus controller according to the present application.

FIG. 12 is a schematic structural diagram of a third embodiment of a data bus controller according to the present application. As shown in FIG. 12, based on FIG. 10 or FIG. 11, the data bus includes a classifier and a service forwarder, and the sending module 13 of the foregoing data bus controller 10 includes:

a first sending unit 131, configured to send the at least one filter and the path identifier list to the classifier, so that the classifier determines a first path identifier of the received data packet according to the at least one filter and the path identifier list, adds the first path identifier to the data packet, and sends, to the service forwarder, the data packet to which the first path identifier is added; and a second sending unit 132, configured to send the path identifier list and the information about the at least one path to the service forwarder, so that the service forwarder forwards, to the corresponding service according to the path identifier list, the path information about the at least one path, and the first path identifier, the received data packet sent by the filter.

The data bus controller provided in this embodiment is configured to execute the technical solution of the data bus controller in the technical solution shown in any one of FIG. 3 to FIG. 9. An implementation principle and technical effects of the data bus controller are similar to those of the technical solution of the data bus controller shown in any one of FIG. 3 to FIG. 9. Details are not described herein again.

Figure 13:
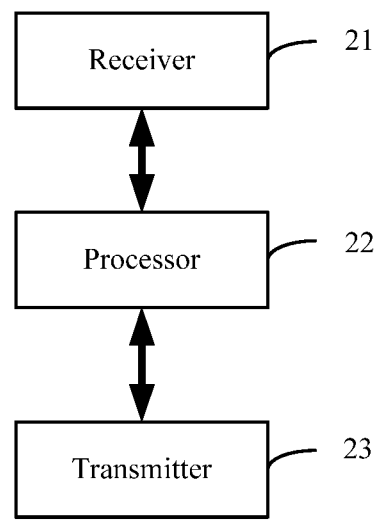
FIG. 13 is a schematic diagram of an embodiment of a data bus controller entity according to the present application.

FIG. 13 is a schematic diagram of an embodiment of an entity of a data bus controller according to the present application. As shown in FIG. 13, the data bus controller is specifically implemented as a data bus controller including a receiver 21, a processor 22, and a transmitter 23.

The receiver 21 is configured to obtain service information of at least one service in a Mobile Edge Computing MEC system, where service information of each service includes a service type and a service identity.

The processor 22 is configured to generate a routing rule according to the service information of the at least one service, where the routing rule is used to indicate at least one path through which a data packet can pass, and each path includes a service identity of at least one service.

The transmitter 23 is configured to send the routing rule to a data bus, so that the data bus forwards, according to the routing rule, a received data packet to a service corresponding to the data packet.

In specific implementation, the processor 22 is specifically configured to obtain the routing rule according to a preset routing rule generation protocol and the service type and the service identity of the at least one service, where the routing rule includes at least one filter and path information corresponding to each filter, and each filter is configured to indicate a source address, a destination address, a sending protocol, a source port number, and a destination port number of a corresponding path.

Each filter is further configured to indicate a base station address and/or a gateway address of the corresponding path.

The receiver 21 is specifically configured to: receive the service information of the at least one service in the MEC system sent by a service registry apparatus; or receive the service information reported by each service in the MEC system; or receive the service information of the at least one service in the MEC system sent by a service manager.

Optionally, the routing rule further specifically includes a path identifier list and path information about at least one path. The path identifier list includes a correspondence between each filter and a path identifier, and the path information includes a path identifier and a service identity of at least one service corresponding to the path identifier.

The data bus includes a classifier and a service forwarder, and the transmitter 23 is specifically configured to:

send the at least one filter and the path identifier list to the classifier, so that the classifier determines a first path identifier of the received data packet according to the at least one filter and the path identifier list, adds the first path identifier to the data packet, and sends, to the service forwarder, the data packet to which the first path identifier is added; and send the path identifier list and the path information about the at least one path to the service forwarder, so that the service forwarder forwards, to the corresponding service according to the path identifier list, the path information about the at least one path, and the first path identifier, the received data packet sent by the filter.

The data bus controller provided in this embodiment is configured to execute the solution of the data bus controller in the method embodiments shown in FIG. 2 to FIG. 9. An implementation principle and technical effects of the data bus controller are similar to those of the solution of the data bus controller shown in FIG. 2 to FIG. 9. Details are not described herein again.

In the foregoing embodiment of the data bus controller, it should be understood that the processor may be a central processing unit (CPU for short), or may be another general purpose processor, a digital signal processor (DSP for short), an application-specific integrated circuit (ASIC for short), or the like. The general purpose processor may be a microprocessor, or the processor may be any conventional processor or the like. The steps of the methods disclosed with reference to the embodiments of the present application may be directly executed by a hardware processor, or may be executed by a combination of hardware in a processor and a software module.

Persons of ordinary skill in the art may understand that all or some of the steps of the method embodiments may be implemented by a program instructing relevant hardware. The program may be stored in a computer readable storage medium. When the program runs, the program executes the steps of the foregoing method embodiments. The foregoing storage medium includes a read-only memory (ROM for short), a RAM, a flash memory, a hard disk, a solid-state hard disk, magnetic tape, a floppy disk, an optical disc, and any combination thereof.

Finally, it should be noted that the foregoing embodiments are merely intended to describe the technical solutions in the present application, but are not intended to limit the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions in the embodiments of the present application.

What is claimed is:

1. A routing rule obtaining method, applied to a Mobile Edge Computing (MEC) system, wherein the MEC system comprises a data bus controller and a data bus, wherein the data bus comprises a classifier and a service forwarder, and the method comprises:

obtaining service information of at least one service in the MEC system by the data bus controller, wherein service information of each service comprises a service type and a service identity;

generating a routing rule according to the service information of the at least one service by the data bus controller, wherein the routing rule is used to indicate at least one path through which a data packet can pass, and wherein the routing rule comprises a path identifier list and path information about at least one path, the path identifier list comprises a correspondence between at least one filter and a path identifier, and the path information comprises a path identifier and a service identity of at least one service corresponding to the path identifier; and sending the routing rule to the data bus, by the data bus controller, wherein the sending the routing rule to the data bus by the data bus controller comprises:

sending the at least one filter and the path identifier to the classifier; and sending the path identifier list and the path information about the at least one path to the servicer forwarder by the data bus controller, wherein the routing rule is received by the data bus and is used by the data bus to forward, according to the routing rule, a received data packet to a service corresponding to the data packet, wherein the receiving the routing rule by the data and forwarding a received data packet according to the routing rule comprises:

receiving the at least one filter and the path identifier list from the data bus controller by the classifier;

determining a first path identifier of the received data packet according to the at least one filter and the path identifier list by the classifier;

determining a first path identifier of the received data packet according to the at least one filter and the path identifier list by the classifier, adding the first path identifier to the data packet, and sending the data packet to which the first path identifier is added to the service forwarder;

receiving the data packet to which the first path identifier is added and that is sent by the classifier by the service forwarder; and forwarding, by the service forwarder to the corresponding service according to the path identifier list, the path information about the at least one path, and the first path identifier, the received data packet sent by the at least one filter.

2. The method according to claim 1, wherein the generating a routing rule according to the service information of the at least one service by the data bus controller comprises:
obtaining the routing rule according to a preset routing rule generation protocol and the service type and the service identity of the at least one service by the data bus controller, wherein the routing rule comprises at least one filter and path information corresponding to each filter, and each filter is configured to indicate a source address, a destination address, a sending protocol, a source port number, and a destination port number of a corresponding path.

3. The method according to claim 1, wherein the obtaining service information of at least one service in the MEC system by the data bus controller comprises:
receiving the service information of the at least one service in the MEC system from a service registry apparatus by the data bus controller; or
receiving the service information from each service in the MEC system by the data bus controller; or
receiving the service information of the at least one service in the MEC system from a service manager by the data bus controller.

4. The method according to claim 1, wherein the data bus comprises a classifier and a service function forwarder, and the sending the routing rule to the data bus by the data bus controller comprises:
sending, by the data bus controller, the at least one filter and the path identifier list to the classifier by the data bus controller; and
sending, by the data bus controller, the path identifier list and the path information about the at least one path to the service forwarder by the data bus controller.

5. A data bus controller, comprising:
a memory; and
a processor coupled to the memory and configured to:
obtain service information of at least one service in a Mobile Edge Computing (MEC) system, wherein service information of each service comprises a service type and a service identity;
generate a routing rule according to the service information of the at least one service, wherein the routing rule is used to indicate at least one path through which a data packet can pass, wherein the generated routing rule comprises a path identifier list and path information about at least one path, the path identifier list comprises a correspondence between at least one filter and a path identifier, and the path information comprises a path identifier and a service identity of at least one service corresponding to the path identifier; and
send the routing rule to a data bus, wherein the data bus comprises a classifier and a service forwarder, and wherein sending the routing rule to the data bus comprises:
sending at least one filter and the path identifier list to the classifier; and
sending the path identifier list and the path information about the at least one path to the service forwarder,
wherein the routing rule is received by the data bus and is used by the data bus to forward, according to the routing rule, a received data packet to a service corresponding to the data packet, wherein the receiving the routing rule by the data and forwarding a received data packet according to the routing rule comprises:

receiving the at least one filter and the path identifier list from the data bus controller by the classifier;
determining a first path identifier of the received data packet according to the at least one filter and the path identifier list by the classifier;
determining a first path identifier of the received data packet according to the at least one filter and the path identifier list by the classifier, adding the first path identifier to the data packet, and sending the data packet to which the first path identifier is added to the service forwarder;
receiving the data packet to which the first path identifier is added and that is sent by the classifier by the service forwarder; and
forwarding, by the service forwarder to the corresponding service according to the path identifier list, the path information about the at least one path, and the first path identifier, the received data packet sent by the at least one filter.

6. The data bus controller according to claim 5, wherein the processor is further configured to:
obtain the routing rule according to a preset routing rule generation protocol and the service type and the service identity of the at least one service, wherein the routing rule comprises at least one filter and path information corresponding to each filter, and each filter is configured to indicate a source address, a destination address, a sending protocol, a source port number, and a destination port number of a corresponding path.

7. The data bus controller according to claim 5, wherein the data bus comprises a classifier and a service function forwarder, and the processor is further configured to:
send the at least one filter and the path identifier list to the classifier; and
sending the path identifier list and the path information about the at least one path to the service forwarder.

8. The data bus controller according to claim 5, wherein the processor is configured to:
receive the service information of the at least one service in the MEC system from a service registry apparatus; or
receive the service information from each service in the MEC system; or
receive the service information of the at least one service in the MEC system from a service manager.

9. A routing rule obtaining system, comprising:
a data bus controller; and
a data bus comprising a classifier and a service forwarder, wherein
the data bus controller obtains service information of at least one service in a Mobile Edge Computing (MEC) system, wherein service information of each service comprises a service type and a service identity;
the data bus controller generates a routing rule according to the service information of the at least one service, wherein the routing rule is used to indicate at least one path through which a data packet can pass, and wherein the routing rule comprises a path identifier list and path information about at least one path, the path identifier list comprises a correspondence between at least one filter and a path identifier, and the path information comprises a path identifier and a service identity of at least one service corresponding to the path identifier;
the data bus controller sends the routing rule to the data bus, wherein the sending the routing rule to the data bus by the data bus controller comprises:
sending the at least one filter and the path identifier to the classifier; and sending the path identifier list and the path information about the at least one path to the servicer forwarder by the data bus controller; and the data bus receives the routing rule from the data bus controller, and forwards, according to the routing rule, a received data packet to a service corresponding to the data packet, wherein the receiving the routing rule from the data bus controller, and forwarding, according to the routing rule, a received data packet to a service corresponding to the data packet by the data bus comprises:

receiving the at least one filter and the path identifier list from the data bus controller by the classifier;

determining a first path identifier of the received data packet according to the at least one filter and the path identifier list by the classifier, adding the first path identifier to the data packet, and sending the data packet to which the first path identifier is added to the service forwarder;

receiving the data packet to which the first path identifier is added and that is sent by the classifier by the service forwarder; and forwarding, by the service forwarder to the corresponding service according to the path identifier list, the path information about the at least one path, and the first path identifier, the received data packet sent by the at least one filter.

10. The system according to claim 9, wherein the data bus controller is configured to:

obtain the routing rule according to a preset routing rule generation protocol and the service type and the service identity of the at least one service, wherein the routing rule comprises at least one filter and path information corresponding to each filter, and each filter is configured to indicate a source address, a destination address, a sending protocol, a source port number, and a destination port number of a corresponding path.

11. The system according to claim 9, wherein the system further comprises at least one service and a service registry apparatus;

each service in the MEC system sends service information of the service to the service registry apparatus;

the service registry apparatus receives the service information from the at least one service;

the service registry apparatus sends the service information of the at least one service to the data bus controller; and the data bus controller receives the service information of the at least one service from the service registry apparatus.

12. The system according to claim 9, wherein the system further comprises at least one service;

each service in the MEC system sends service information of the service to the data bus controller; and the data bus controller receives the service information reported by each service.

13. The system according to claim 9, wherein the system further comprises a service manager;

the service manager obtains the service information of the at least one service in the MEC system and sends the service information of the at least one service to the data bus controller; and the data bus controller receives the service information of the at least one service from the service manager.

* * * * *